(12) United States Patent
Allen

(10) Patent No.: US 6,744,891 B1
(45) Date of Patent: *Jun. 1, 2004

(54) METHODS AND SYSTEM FOR ENSURING ROYALTY PAYMENTS FOR DATA DELIVERED OVER A TELEPHONE NETWORK UTILIZING BIDIRECTIONAL COMMUNICATION

(75) Inventor: Jonathon Brandon Allen, Mountainside, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/442,352

(22) Filed: Nov. 17, 1999

Related U.S. Application Data

(63) Continuation of application No. 08/280,039, filed on Jul. 25, 1994, now Pat. No. 6,041,316.

(51) Int. Cl.[7] .......................... H04N 7/167; H04N 9/00
(52) U.S. Cl. ................... 380/231; 705/52; 713/193
(58) Field of Search ............................ 705/52, 51, 55; 713/193; 380/231

(56) References Cited

U.S. PATENT DOCUMENTS

| | | | | |
|---|---|---|---|---|
| 5,341,429 A | * | 8/1994 | Stringer et al. | ............. 705/52 |
| 5,388,211 A | * | 2/1995 | Hornbuckle | ............. 717/11 |
| 5,495,411 A | * | 2/1996 | Ananda | ............. 705/32 |
| 6,041,316 A | * | 3/2000 | Allen | ............. 705/52 |

* cited by examiner

Primary Examiner—Gilberto Barrón

(57) ABSTRACT

A method and system for delivering data over a communication network which ensures-proper payment of royalties while preserving free access to data for purposes such as browsing or research. An exemplary method in accordance with the present invention includes the steps of providing a partially-degraded version of the data over the network, without payment of a royalty fee, to a customer at a user terminal connected to the network; and providing a higher quality version of the data to the customer over the network if the customer is entitled to receive the higher quality version. The determination as to whether the customer is so entitled may be made by, for example, determining if a royalty fee payment has been received. The partially-degraded version of the data is substantially recognizable when displayed, printed, played, run or otherwise utilized by the customer at the user terminal, and may be generated by, for example, deleting or encrypting a portion of the undegraded data. The higher quality version may be provided by transmitting the complete higher quality version, or transmitting remaining data such as the deleted portion or a decryption key, to the user terminal.

13 Claims, 2 Drawing Sheets

METHODS AND SYSTEM FOR ENSURING ROYALTY PAYMENTS FOR DATA DELIVERED OVER A TELEPHONE NETWORK UTILIZING BIDIRECTIONAL COMMUNICATION

This is a continuation of application Ser. No. 08/280,039 filed on Jul. 25, 1994, now U.S. Pat. No. 6,041,316.

BACKGROUND OF THE INVENTION

1. Field of the Invention

The present invention relates generally to improvements in communication systems and services. More particularly, the present invention relates to techniques for ensuring payment of royalties for copyrighted data delivered over a communication network.

2. Description of Prior Art

The recent expansion of wide area computer communication networks, such as the Internet, as well as the planned development of the so-called information superhighway, promise ready availability of an infinite array of data to users around the world. The data available over the network may include, for example, text, audio, video and other animation, still images and virtual reality sensations. A serious problem in implementing the information superhighway or other wide area communication network is the fundamental conflict between ready access to network data, and the need for the data creators to receive appropriate royalties. Failure to provide adequate royalties for creators may limit the amount and quality of available data. On the other hand, a strict requirement of royalty payments prior to data delivery would place an excessive burden on users, particularly those involved in education and research, and limit the effectiveness of the network as a widely-used communication medium.

A prior art technique presently used to ensure royalty payments for data transferred by computer network involves encrypting the data prior to transfer. After a user has paid an appropriate royalty fee, the user receives a decryption key which allows the encrypted data to be converted to a usable form. Unfortunately, encryption often converts the data to a completely unrecognizable form, such that users unfamiliar with the data content will be unable to determine its usefulness without first paying the royalty. Users are placed at a significant disadvantage in conducting research, which often involves examining large amounts of unknown data. For example, a high school or college student using the network to research paintings from a particular period or artist will likely want to browse through a large number of still images, on the order of 100 or more. If a database provider charged the student to view each and every image, the cost would unduly limit the scope of the research.

Similar problems are encountered by users interested in copyrighted music or lyrics, newspaper and magazine articles, published court decisions, U.S. and foreign patents, articles in scientific and technical journals, and a wide variety of other data. Although these types of data are currently available in a number of different databases which users may access over a network, prior art techniques generally do not allow users to access any useful portion of the data without first agreeing to pay for the delivered data. For example, U.S. Pat. No. 5,050,213 discloses a prior art system which allows users of an encrypted CD-ROM database to browse through the database on a browsing workstation containing proprietary computer and display components. However, the user typically must perform the browsing at the proprietary workstation, rather than over a network using a standard personal computer, and generally must pay a fee to gain access to data even for browsing. In addition, the user browses a full quality version of the data even though a lesser quality version may be sufficient to determine suitability of the data. This system is thus inefficient and not conducive to widespread data access over a network.

The prior art data delivery systems also fail to recognize that a liberal access policy can be in the best interests of information creators. If people are not exposed to high quality information, people will not come to depend on it and seek it out. Providing widespread access to information can thus be considered a form of advertising or investment for creators. As noted above, however, the access should be provided in a way which enables the creators to recover the royalties they deserve. Prior art network data delivery techniques have failed to resolve this conflict satisfactorily and are generally incompatible with the liberal and widespread access goals of the much-publicized information superhighway.

As is apparent from the above, a need exists for a method and system which ensure payment of royalties for high quality data delivered over a communication network, without unduly restricting widespread access to the data for browsing, education and other purposes.

SUMMARY OF THE INVENTION

The present invention provides a method and system for ensuring payment of royalties for data delivered over a communication network. The present invention resolves the conflict between free access and payment of royalties by providing liberal access to partially-degraded data suitable for browsing or research, and charging users a royalty to receive a higher quality version of the data suitable for purposes such as entertainment.

In accordance with one aspect of the present invention, a method of delivering data to a user terminal over a communication network is provided. The exemplary method includes the steps of providing a partially-degraded version of the data over the network, without payment of a royalty fee, to a customer at the user terminal; and providing a higher quality version of the data to the customer over the network if the customer is entitled to receive the higher quality version. The determination as to whether the customer is so entitled may be made by, for example, determining if a royalty fee payment has been received. The partially-degraded version of the data is substantially recognizable when displayed, printed, played, run or otherwise utilized at the user terminal, and may be generated by, for example, deleting or encrypting a portion of the undegraded data. The higher quality version may be provided by transmitting the complete higher quality version, or transmitting remaining data such as the deleted portion or a decryption key, to the user terminal.

In accordance with another aspect of the present invention, a data delivery method is provided which includes the steps of receiving a request for the data from a customer at one of the user terminals; retrieving the requested data from the information database; partially degrading the data such that after the partial degradation the data remains substantially recognizable when utilized by the customer; transmitting the partially-degraded data to the customer over the communication network; determining whether the customer is entitled to receive a higher quality version of the data; and providing the higher quality version to the customer if the customer is entitled to receive it.

In accordance with another aspect of the present invention, a system for delivering data over a network is provided. The system includes a provider database containing the data; and a digital data processor connected to the provider database, for processing a request for the data from a customer at the user terminal, such that a partially-degraded version of the data is provided to the customer over the network, without payment of a royalty fee, and a higher quality version of the data is provided to the customer over the network, for example, upon payment of the royalty fee. Again, the partially-degraded version, when displayed or otherwise utilized at the user terminal, is substantially recognizable to the customer and suitable for limited usage.

In accordance with a further aspect of the present invention, a customer may be provided with an option of selecting a version of the desired data at one of a number of different data quality levels, and the amount of royalty payment required to receive a given version may vary depending on the quality level selected. In this manner, users need not pay for a higher quality version of the data than necessary for a given application.

The present invention ensures payment of royalties for data received over a communication network in part because delivered data generally remains partially-degraded until an appropriate royalty is paid. At the same time, network users are provided with substantially free access to a wide array of data which is readily recognizable and usable for limited purposes such as research. The users can therefore browse through a variety of available data to decide which data to purchase in a higher quality or undegraded form.

Additional features and advantages of the present invention will become readily apparent by reference to the following detailed description and the accompanying drawings.

DETAILED DESCRIPTION

Figure 1:
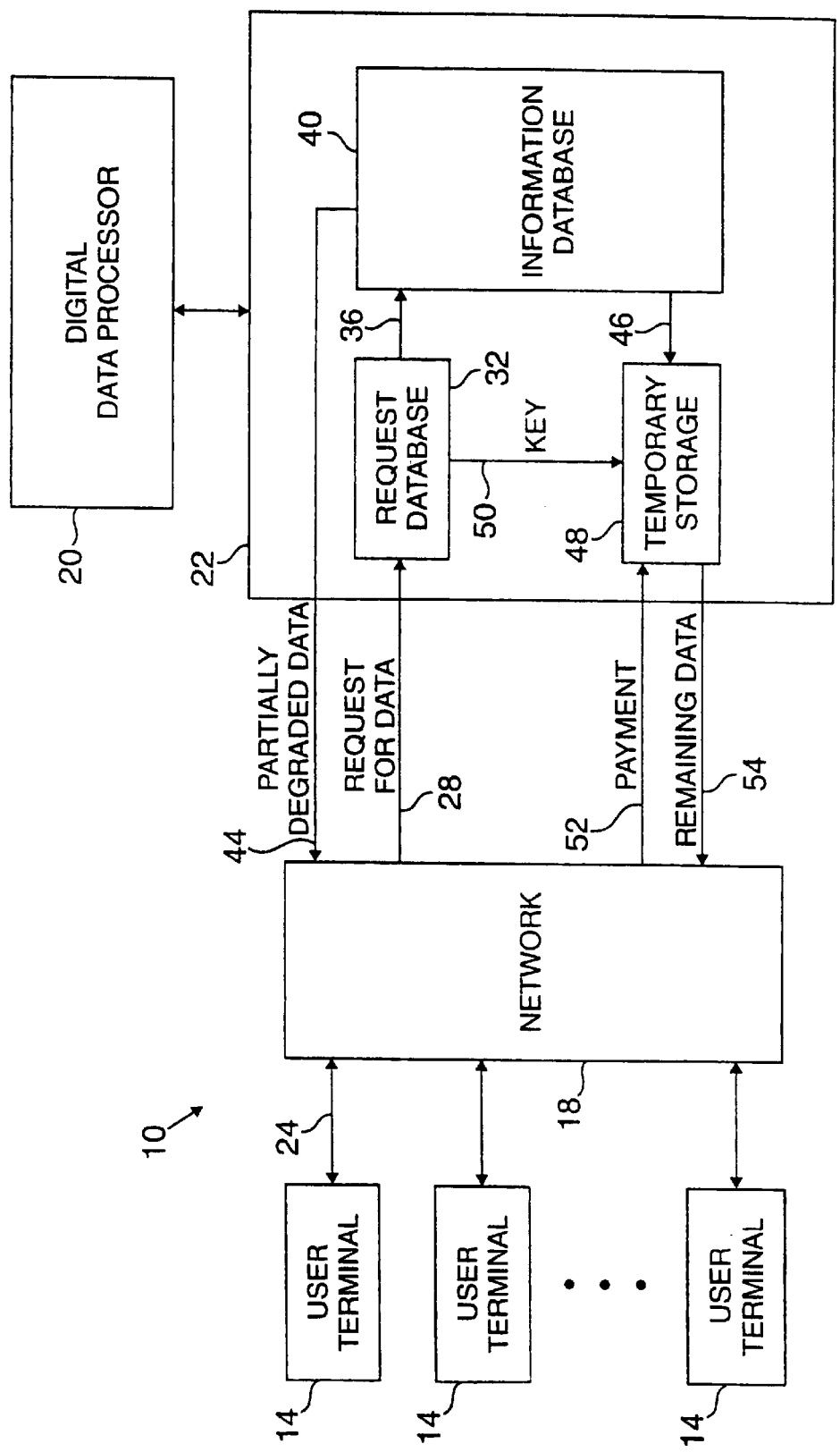
FIG. 1 is a block diagram of an exemplary system for delivering data over a network in accordance with the present invention.

FIG. 1 is a block diagram of an exemplary system 10 for delivering data in accordance with the present invention. The system 10 includes a number of user terminals 14, a network 18, a digital data processor 20 and a provider database 22. The user terminals 14 may be, for example, personal computer terminals, and are connected in a manner well-known in the art to communicate over network 18 with other user terminals and the provider database 22. The network 18 may be a local-area network (LAN), a wide-area-network (WAN), a local or long-distance telephone switching network, or any of a number of other communication networks. The line 24 provides a bidirectional communication link between user terminal 14 and network 18 and may represent, for example, a telephone line or a high rate data line.

The provider database 22 may be, for example, one of many databases which maintain a link with network 18 over telephone lines, high rate data lines, and the like. Although the provider database 22 is shown in FIG. 1 as including several distinct lines interconnecting the database 22 with network 18, those skilled in the art will recognize that all communications between network 18 and provider database 22 may take place over a single line, such as a single telephone line or high rate data line. The digital data processor 20 directs the operations of provider database 22, and may be, for example, a microcomputer, a mainframe computer, or a group of networked computers. The data processor 20 and provider database 22 are generally maintained by a provider which charges users to deliver copyrighted data. A wide variety of data is currently available from such providers, including text, video and still images. Additional types of data are projected to become available with the continued development of communication networks such as the Internet. The provider database 22 may be accessed from user terminal 14 in a conventional manner, such as by dialing a number using a modem in the user terminal. A connection is then established between a particular user terminal 14 and provider database 22 through the network 18. For illustrative purposes, FIG. 1 shows direct connections between provider database 22 and network 44, although it should be understood that the connection lines generally pass through and are controlled by digital data processor 20.

A customer makes a request from his or her user terminal 14 to view data which is stored in provider database 22. The request for data is transmitted through the network 18 over line 28 and directed by digital data processor 20 to a request database 32. The request database 32 stores the customer request in order to track the interaction between the customer and the database 22. The request database also provides the request to an information database 40 which contains the desired data. The information database 40 provides a partially-degraded version of the desired data over line 44 to the network 18 and thereby to the customer at user terminal 14. A partially-degraded version is defined herein as a version which, when displayed, printed, played, run or otherwise utilized at the user terminal, is substantially recognizable to the customer as a particular type of data and is therefore suitable for use in browsing and/or research or for other purposes which do not require full resolution undegraded data. In one embodiment of the invention, the partially-degraded version, also referred to herein as partially-degraded data, is a subset of the complete undegraded data. The customer may use the partially-degraded version of the data to determine if the data is of sufficient importance or desirability to justify the payment of a royalty to obtain a higher quality or undegraded version.

The information database 40 may be directed by digital data processor 20 to provide, for example, a complete undegraded version of the requested data over a line 46 to a temporary storage 48. The temporary storage may be a group of memory locations within database 22 which are set aside for temporary storage of data previously delivered to customers in a partially-degraded form. The temporary storage 48 facilitates the transfer of remaining data, or transfer of a higher quality or undegraded version of the data, to the customer upon payment of a fee.

In one embodiment of the present invention, the data is provided in its undegraded form from information database 40 to temporary storage 48. The temporary storage 48 receives a payment or payment authorization over a line 52 indicating that the customer previously provided with the partially-degraded data has paid or promised to pay the required royalty and is entitled to receive the data in its undegraded form. The temporary storage then releases the remaining data over a line 54 onto the network 18 and thereby to the user terminal 14. Because the partially-degraded version of the data has already been transferred to the user terminal, it is not necessary to download the complete set of requested data to the user upon payment of the fee. The present invention thus provides efficient transfer of data from provider database 22 to the user terminal 14.

In an alternative embodiment of the present invention, the partially-degraded version of the data provided to the user terminal 14 over line 44 may also include a portion of the complete data in an encrypted form. Any number of different encryption techniques could be used to encrypt a portion of the data, and these techniques are generally well known in the art and will therefore not be further described herein. In order to provide the customer at user terminal 14 with an undegraded version of the complete data upon payment of the royalty fee, the request database 32 provides a decryption key for the encrypted portion of the data to temporary storage 48 over line 50. The temporary storage 48 will then provide the key over line 54 to the network 18 and user terminal 14 such that the user terminal 14 can decrypt the encrypted portion of the data and thereby reconstruct an undegraded version of the data. As another alternative, the information database 40 could provide the partially-degraded version of the data to temporary storage 48 and the temporary storage 48 could use the decryption key from request database 32 to regenerate an undegraded version of the data to be sent over line 54 to the user terminal upon payment of the appropriate fee. Those skilled in the art will recognize that the data requests, the payment information, and/or the remaining data could also be exchanged directly between the information database 40 and user terminals 14 via the network 18. In addition, the decryption key could be provided from elsewhere in the provider database 22 or data processor 20, instead of from request database 32.

In other embodiments, a customer may be provided with an option to select one of a number of different quality levels in which to receive a higher quality version of the requested data. The amount of royalty fee payment required may vary depending on the quality level selected. For example, still image data could be provided at one of five different resolution levels. The lowest level of resolution corresponds to a partially-degraded version of the data and is provided without payment of a royalty fee. The four higher resolution levels correspond to increasingly higher quality versions of the requested data, and each version may have a different royalty fee associated therewith. After the customer makes a royalty fee payment, the higher quality version is provided at the quality level commensurate with the amount of royalty fee paid. A customer is therefore not required to pay the full royalty fee for an undegraded version to obtain a quality level above that of the partially-degraded version.

The information database 40 may store partially-degraded, higher quality, and/or undegraded versions of the requested data. These various versions may be individually predetermined and pre-stored such that, in response to a request for data, the provider database 22 need not partially-degrade the data, but can instead directly transmit the appropriate version of the data to the customer. In one such embodiment, in response to a request for data, a determination could be made as to whether the customer is entitled to receive a higher quality version. If the customer is not entitled to the higher quality version, they are still entitled to the partially-degraded version. The appropriate version could then be retrieved from the information database 40 and transmitted to the customer.

The information database 40 could also individually pre-store both a partially-degraded version and remaining data, such that, again, a separate partial degradation step is unnecessary. In such an embodiment, the provider database 22, in conjunction with digital data processor 20, could retrieve the partially-degraded version from information database 40, and transmit the partially-degraded version to the customer. A determination as to whether the customer is entitled to a higher quality or undegraded version of the data is then made. This determination may involve, for example, determining if the appropriate royalty fee has been paid. If the customer is so entitled, the remaining data could be retrieved from the information database 40, and transmitted to the customer.

Although shown as a separate element in FIG. 1, the provider database 22 may be part of digital data processor 20. For example, the information database 40, request database 32 and temporary storage 48 may be preallocated memory locations of an electronic or magnetic memory within the digital data processor 20. The partial degradation of the requested data, the processing of customer requests and payment information, the display of appropriate messages to the customers at user terminals 14, the transfer of data, and other operations of the provider database 22 may be implemented by programming the digital data processor 20 which operates the database 22 using appropriate software, firmware, and/or hardware in a manner well-known in the art.

Figure 2:
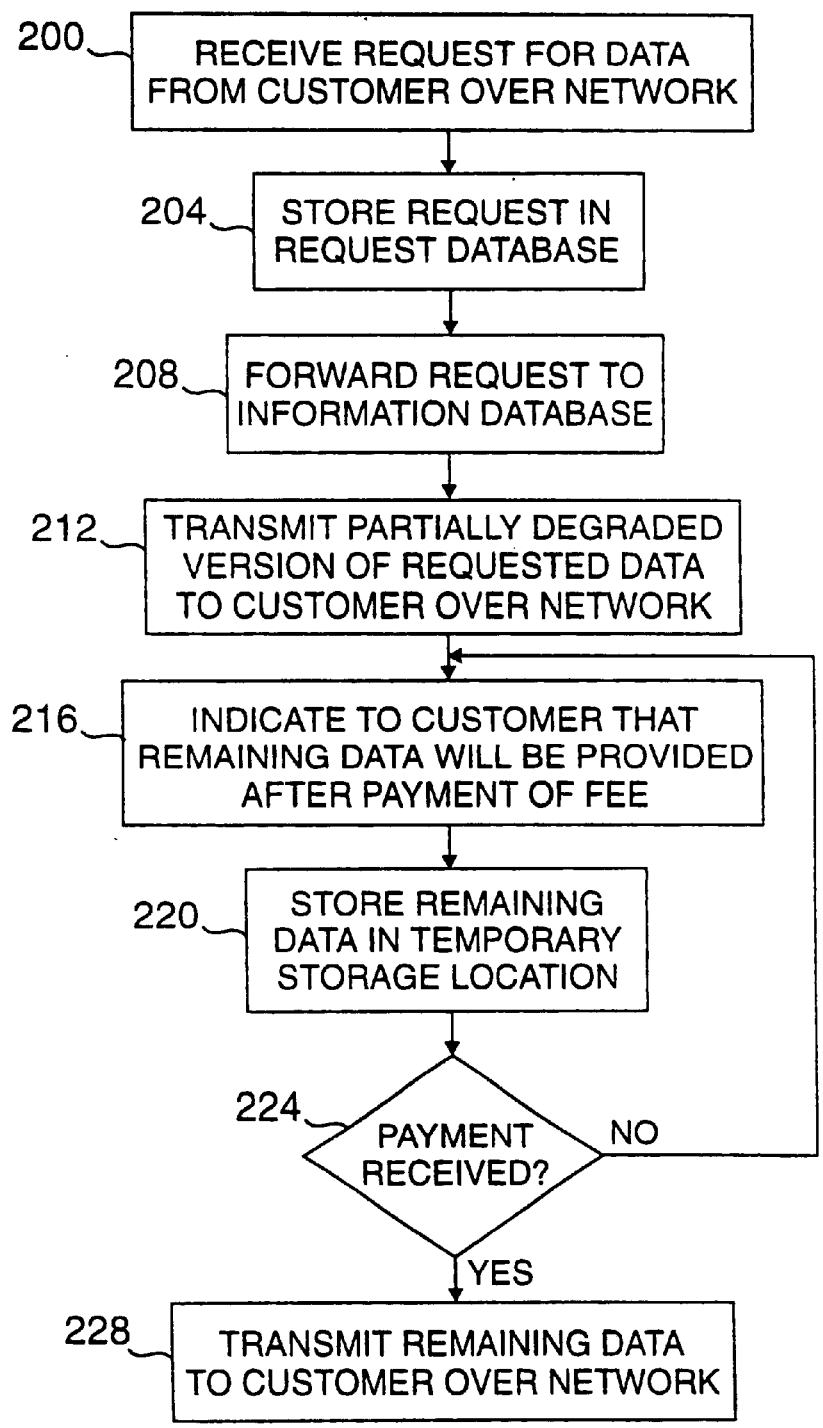
FIG. 2 is a flow diagram illustrating an exemplary method of delivering data over a network in accordance with the present invention.

FIG. 2 is a flow diagram illustrating an exemplary method of delivering data over a network in accordance with the present invention. In operation block 200, a customer request for a particular piece of data is received in provider database 22 from a particular user terminal 14 via network 18 and line 28. The digital data processor 20 stores the request in the request database 32, as indicated in operation block 204. Block 208 indicates that the data processor 20 then directs request database 32 to forward the data request to the information database 40. The information database 40 then transmits a partially-degraded version of the requested data to the customer over the network 18. The partially-degraded version of the requested data may be, for example, a subset of the complete data, or the complete data with a portion thereof encrypted such that the overall data quality is reduced. In any case, however, the partially-degraded version of the data remains in a substantially recognizable form, such that the customer may make limited use thereof for browsing, research, evaluation as to suitability or desirability, and the like.

The data processor 20 then directs provider database 22 to indicate to the customer receiving the partially-degraded data that the complete undegraded data will be provided upon the payment of an appropriate royalty fee, as shown in block 216. Alternatively, a royalty fee schedule could be provided to the customers at or before their initial access to provider database 22. The system 10 then need not supply an indication that a royalty fee is required for higher quality data in response to each customer request. As used herein, the term "royalty feel" refers to a charge which is generally greater than a nominal service charge, if any, for use of a given database, and is sufficient to provide adequate compensation to the data creator for use of a particular piece of data. A payment of the royalty fee may include actual payment, payment authorization via a credit card number or preestablished account number, a promise to pay, or any of a number of other types of payment. It should also be understood that indications other than receipt of a royalty fee payment may be used herein to determine if a customer is entitled to receive a higher quality or undegraded version of the data.

The remaining data, which may include a decryption key suitable for decrypting any portion of the data which was encrypted prior to being supplied to the user terminal 14, is then stored in temporary storage 48, as shown in block 220. The decryption key may be transferred to temporary storage 48 from request database 32, as shown in FIG. 1, or the key may be transferred to temporary storage 48 from, for example, information database 40 or digital data processor 20. As noted above, in alternative embodiments, the remaining data may be provided directly from information database 40 to network 18 in response to evidence of payment. As used herein, the term "remaining data" refers to any additional data which, taken together with the partially-degraded data, includes sufficient information to provide the customer at user terminal 14 with a higher quality or undegraded version of the requested data. A decryption key, even though not part of the complete requested data, is therefore considered remaining data for purposes of the present invention.

Decision block 224 indicates that the data processor 20 and provider database 22 monitor the connection with the customer through network 18 in order to determine if the customer has paid a predetermined royalty fee entitling the customer to receive a higher quality or undegraded version of the requested data. If the customer has authorized or otherwise ensured payment, block 228 indicates that the provider database 22 then provides a higher quality or undegraded version by, for example, transmitting the remaining data to the customer via network 18. In other embodiments, the provider database 22 may provide a higher quality or undegraded version of the requested data by transmitting the entire higher quality or undegraded version, respectively, including any previously-transmitted data. If the royalty payment has not been received, the provider database 22 may wait a predetermined time and again provide an indication to the customer regarding payment of a royalty fee to receive an undegraded version of the data. Alternatively, a message may be continually displayed to the customer via user terminal 14 setting forth the royalty payment policy.

The present invention may also include the step of partially degrading the requested data to produce a partially-degraded version thereof. The type of partial degradation applied to the data may be determined in each application by the data creator. As noted above, the partial degradation should preserve the utility of the data for certain preferred applications, such as browsing and research. The partially-degraded data should therefore remain substantially recognizable, such that a customer is able to ascertain its general contents and characteristics. The type of partial degradation which is applied may vary depending upon the type of data requested, and any of a number of techniques may be used to produce the partially-degraded version of a given piece of data. The process of producing a partially-degraded version of a piece of requested data will be referred to herein as data reduction.

Exemplary data reduction techniques suitable for generating a partially-degraded version of a given piece of data include the following. Major or key portions of the data could be filtered out or otherwise deleted without rendering the data unrecognizable. Different levels and types of noise could be added to the data to set a particular quality level. One or more portions of the data could be encrypted, while the remaining portions are unencrypted and recognizable. A header, trailer and/or other notices could be placed at various points in the data indicating that the data has been provided to the customer for evaluation purposes only. A short preview of the data could be provided. The data could be provided in the form of a read-once copy or a copy which self-destructs as it is viewed, such that the customer will require a new copy after reviewing the data once. As another alternative, the partially-degraded version of the data could be a copy which includes a usage time limitation such that the data is destroyed or otherwise rendered unusable after elapse of a predetermined time.

The data of the present invention may be generally classified into a number of basic categories including audio, video, still images, text and software. Exemplary data reduction techniques well-suited for use with these particular types of data will now be described. It should be recognized, however, that each of the techniques described below could also be used with other types of data.

In regard to audio data, such as music, a partially-degraded version could include clicks or other types of additive noise interspersed throughout the data. As an example, a user accessing an audio database to search for a certain type of music or a particular lyric could receive free access to versions of recorded audio degraded with additive noise or filtering. These versions are readily recognizable but generally unsuitable for entertainment purposes, and could have an audio quality level at or below that produced over a standard telephone line. Alternatively, comments could be added to the beginning or end of the audio data and/or at one or more points within the data.

Video data such as television images, movies and the like could be partially degraded by deleting color, adding noise, or deleting important passages without destroying the usefulness of the data as a whole. Still image data in the form of, for example, graphics files could be partially degraded by reducing contrast or resolution. For bitmapped still images, blotches, blurs or other noise could be added, or contrast could be reduced.

Partially-degraded versions of text data, such as newspapers and periodicals, published court decisions, U.S. and/or foreign patents and trademarks, corporate data and personal data, could be generated by deleting or otherwise withholding certain portions of the data. For example, news headlines and/or summaries could be provided free of charge but corresponding detailed articles could be provided only after payment of a royalty fee, or certain key personal information such as addresses or telephone numbers could be withheld until the fee is paid. As another example, a database of U.S. or foreign patents could provide free access via a network to an abstract and/or any figures, while withholding delivery of an entire patent until payment is made. In addition, text data in the form of a bitmapped image could be treated as a still image, and degraded with additive noise or a reduction in resolution.

Software data may be partially degraded in accordance with the present invention using any of a number of techniques. For example, a program could be provided with a time usage limitation or a functionality restriction. Possible functionality restrictions include a file size limit or a limited output capability. A partially-degraded version of a word processing program, for example, could print the word "draft" prominently across each page of printed output. Partially-degraded versions of computer games might be limited to play on certain levels absent payment of a required royalty fee. The above data reduction techniques can generally be implemented in a well-known manner by those of ordinary skill in the art. Of course, the present invention may also be utilized with reduction techniques and data types other than those described.

It should be understood that the system of FIG. 1 with which the present invention has been described is exemplary only. Many variations may be made in the arrangements shown, including, for example, the interconnections between the user terminals, the network and the provider database, the manner of determining whether a customer is entitled to receive a higher quality or undegraded version of the data, the manner of partially degrading a particular type of data, the manner in which the data requests are received, stored and processed, and the manner in which a higher quality or undegraded version of the data is transmitted to the user. These and other alternatives and variations will be readily apparent to those skilled in the art, and the present invention is therefore limited only by the appended claims.

I claim:

1. A method of delivering data over a telephone communication network utilizing bidirectional communication while preserving widespread online access for a first class of use for limited purposes and ensuring proper payment of royalties for a second class of unrestricted use, the method comprising the steps of:

generating a partially-degraded version of the data suitable for the first class of use, but unsuitable for the second class of use, by altering a portion of the data to reduce its perceived quality when utilized;

providing the partially-degraded version of the data over the network to a customer online at a user terminal connected to the network in response to a customer request made utilizing the user terminal and transmitted over the network; and providing a higher quality version of the data suitable for the second class of unrestricted use to the customer over the network if the customer is entitled to receive the higher quality version wherein the step of providing a higher quality version of the data to the customer over the network includes transmitting remaining data to the customer such that the remaining data and the partially-degraded version of the data together provide the higher quality version of the data.

2. A method of delivering data over a telephone communication network utilizing bidirectional communication while preserving widespread online access for a first class of use for limited purposes and ensuring proper payment of royalties for a second class of unrestricted use, the method comprising the steps of:

generating a partially-degraded version of the data suitable for the first class of use, but unsuitable for the second class of use, by altering a portion of the data to reduce its perceived quality when utilized;

providing the partially-degraded version of the data over the network to a customer online at a user terminal connected to the network in response to a customer request made utilizing the user terminal and transmitted over the network;

providing a higher quality version of the data suitable for the second class of unrestricted use to the customer over the network if the customer is entitled to receive the higher quality version wherein providing a higher quality version of the data includes the steps of:

providing the customer with an option to select from a plurality of increasingly higher quality versions of the data; and providing the selected higher quality version to the customer over the network upon payment of a royalty fee in an amount corresponding to the selected data quality.

3. A method of delivering data over a telephone communication network utilizing bidirectional communication while preserving widespread online access for a first class of use for limited purposes and ensuring proper payment of royalties for a second class of unrestricted use, the method comprising the steps of:

generating a partially-degraded version of the data suitable for the first class of use, but unsuitable for the second class of use, by altering a portion of the data to reduce its perceived quality when utilized;

providing the partially-degraded version of the data over the network to a customer online at a user terminal connected to the network in response to a customer request made utilizing the user terminal and transmitted over the network; and providing a higher quality version of the data suitable for the second class of unrestricted use to the customer over the network if the customer is entitled to receive the higher quality version;

receiving a request for the data from the customer at the user terminal;

retrieving the requested data from an information database;

partially degrading the data to produce the partially-degraded version;

transmitting the partially-degraded version to the customer over the communication network; and determining whether the customer is entitled to receive the higher quality version of the data.

4. The method of claim 3 wherein the step of partially degrading the data includes encrypting a portion of the data.

5. The method of claim 3 further including the step of storing the request for the data from the customer in a request database.

6. The method of claim 3 further including the step of storing remaining data in a temporary storage location after request is received.

7. A method of delivering data comprising text, video, still images or audio to a plurality of user terminals over a telephone communication network utilizing bidirectional communication while ensuring proper payment of royalties and preserving widespread access for evaluation, comprising the steps of:

receiving a request transmitted over the network for the data from a customer at one of the user terminals seeking to evaluate the data;

retrieving the requested data from an information database;

partially degrading the data to provide a partially-degraded version thereof by altering a portion of the data in a manner so that the partially degraded data has a reduced perceived quality when utilized, but as a whole remains in a substantially recognizable form suitable for evaluation;

transmitting the partially-degraded version of the data to the customer over the communication network; and providing a higher quality version of the data to the customer over the network if the customer is entitled to receive the higher quality version wherein the step of providing a higher quality version further includes transmitting remaining data to the customer such that the remaining data and the partially-degraded version of the data together provide the higher version of the data.

8. A method of delivering data comprising text, video, still images or audio to a plurality of user terminals over a telephone communication network utilizing bidirectional communication while ensuring proper payment of royalties and preserving widespread access for evaluation, comprising the steps of:

receiving a request transmitted over the network for the data from a customer at one of the user terminals seeking to evaluate the data;

retrieving the requested data from an information database;

partially degrading the data to provide a partially-degraded version thereof by altering a portion of the data in a manner so that the partially degraded data has a reduced perceived quality when utilized, but as a whole remains in a substantially recognizable form suitable for evaluation;

transmitting the partially-degraded version of the data to the customer over the communication network;

providing a higher quality version of the data to the customer over the network if the customer is entitled to receive the higher quality version wherein the step of providing a higher quality version of the data further includes the steps of:
 retrieving the higher quality version from the information database; and
 transmitting the higher quality version of the data to the customer.

9. A method of delivering data over a telephone communication network utilizing bidirectional communication, comprising the steps of:

generating a partially-degraded version of the data suitable for evaluation by altering a portion of the data to reduce its perceived quality when utilized;

providing the partially degraded version of the data over the network to a customer at a user terminal connected to the network in response to a customer request made utilizing the user terminal;

determining if the customer is entitled to receive a higher quality version of the data;

providing the higher quality version of the data to the customer over the network if the customer is entitled to receive the higher quality version wherein the step of providing the higher quality version of the data includes the steps of:
 retrieving the higher quality version of the data from an information database; and
 transmitting the higher quality version to the customer over the network.

10. A method of delivering data over a telephone communication network utilizing bidirectional communication, comprising the steps of:

generating a partially-degraded version of the data suitable for evaluation by altering a portion of the data to reduce its perceived quality when utilized;

providing the partially degraded version of the data over the network to a customer at a user terminal connected to the network in response to a customer request made utilizing the user terminal;

determining if the customer is entitled to receive a higher quality version of the data;

providing the higher quality version of the data to the customer over the network if the customer is entitled to receive the higher quality version wherein the step of providing the higher quality version of the data includes the steps of:
 retrieving remaining data from an information database; and
 transmitting the remaining data to the customer over the network.

11. A method of delivering data over a telephone communication network utilizing bidirectional communication, comprising the steps of:

generating a partially-degraded version of the data suitable for evaluation by altering a portion of the data to reduce its perceived quality when utilized;

providing the partially degraded version of the data over the network to a customer at a user terminal connected to the network in response to a customer request made utilizing the user terminal;

determining if the customer is entitled to receive a higher quality version of the data;

providing the hither quality version of the data to the customer over the network if the customer is entitled to receive the higher quality version wherein the step of providing the higher quality version of the data includes the steps of:
 retrieving the higher quality version of the data from an information database; and transmitting the higher quality version to the customer over the network.

12. A method of delivering data over a telephone communication network utilizing bidirectional communication while preserving widespread access for a first class of use for limited purposes and ensuring property payment of royalties for a second class of use, the method comprising the steps of:

receiving a request for the first class of use of the data from a customer at a user terminal connected to the network, the request being transmitted over the network;

generating a partially-degraded version of the data suitable for the first class of use by altering a portion of the data;

providing the partially-degraded version of the data to the customer;

receiving a request for the second class of use of the data from the customer at a user terminal connected to the network, the request being transmitted over the network;

determining if the customer is entitled to receive a higher quality version of the data suitable for the second class of use;

providing the higher quality version of the data to the customer if the customer is entitled to receive the higher quality version wherein the step of providing the higher quality version includes the steps of:
 retrieving remaining data from an information database; and
 transmitting the remaining data to the user terminal over the network.

13. A method of delivering data over a telephone communication network utilizing bidirectional communication while preserving widespread access for a first class of use for limited purposes and ensuring property payment of royalties for a second class of use, the method comprising the steps of:

receiving a request for the first class of use of the data from a customer at a user terminal connected to the network, the request being transmitted over the network;

generating a partially-degraded version of the data suitable for the first class of use by altering a portion of the data;

providing the partially-degraded version of the data to the customer;

receiving a request for the second class of use of the data from the customer at a user terminal connected to the network the request being transmitted over the network;

determining if the customer is entitled to receive a higher quality version of the data suitable for the second class of use;

providing the higher quality version of the data to the customer if the customer is entitled to receive the higher quality version wherein the step of providing the higher quality version includes the steps of:

retrieving the higher quality version from an information database; and transmitting the higher quality version to the user terminal over the network.

* * * * *